United States Patent [19]

Martin

[11] Patent Number: 5,410,138

[45] Date of Patent: Apr. 25, 1995

[54] MAGNETIC TAG READING APPARATUS

[75] Inventor: Philippe Martin, Beaune, France

[73] Assignee: Kiota International, La Ciotat, France

[21] Appl. No.: 99,486

[22] Filed: Jul. 28, 1993

[30] Foreign Application Priority Data

Jul. 29, 1992 [FR] France ................ 92 09375

[51] Int. Cl.⁶ .................... G06K 7/08; G06K 7/10; G06K 19/00; G06K 19/06
[52] U.S. Cl. .................. 235/449; 235/472; 235/487; 235/493
[58] Field of Search ............. 235/449, 472, 487, 493

[56] References Cited

U.S. PATENT DOCUMENTS

| 3,916,386 | 10/1975 | Teixeira et al. | 235/472 X |
| 4,186,416 | 1/1980 | Nozaki et al. | 235/449 X |
| 4,197,987 | 4/1980 | Lazzari | 235/449 |
| 5,294,782 | 3/1994 | Kunar | 235/472 X |

FOREIGN PATENT DOCUMENTS

| 0376109 | 4/1990 | European Pat. Off. . |
| 2393318 | 12/1978 | France . |
| 2413723 | 7/1979 | France . |
| 58-106658 | 6/1983 | Japan ................ 235/449 |

Primary Examiner—Donald Hajec
Assistant Examiner—Jeffrey R. Filipek
Attorney, Agent, or Firm—Kerkam, Stowell, Kondracki & Clarke; William L. Feeney

[57] ABSTRACT

A reading apparatus simultaneously detects all the magnetic states previously recorded on a length of a magnetic strip on a substrate. The apparatus has detectors for simultaneously detecting all the magnetic states coded on the magnetic strip and for generating electrical signals indicative of the magnetic states. An electronic circuit processes the electrical signals in order to determine the meaning of the magnetic states. A display shows the meaning of the magnetic states. The apparatus is used to read flexible magnetic tags attached to garments.

13 Claims, 2 Drawing Sheets

MAGNETIC TAG READING APPARATUS

BACKGROUND OF THE INVENTION

The invention relates to reading apparatus for the simultaneous detection of all the magnetic states previously recorded on a determined length of a magnetic strip arranged on a substrate and, more particularly, on a textile one.

The products which are sold, especially in the field of food products, often bear "labels" or "tags" consisting of "bar codes", which define some features of the products, such as an identification number in a nomenclature, the latest date of use, etc... Such tags are read by an appropriate optical device at the pay-desk of the store and the data thus obtained are used to determine, for instance, the price of the sold product and to update the stock on hand.

Generally, such tags are directly printed on the product packing, which packing exhibits some degree of rigidity, thus facilitating the error-proof reading of the bar codes of the tag.

Such tags may also be used for clothes, but in this case they must be placed on the wrapping in order to provide said rigidity, but, since the wrapping may be easily separated from the garment, which may lead to errors and to fraud.

It is therefore important that the tag be placed on the garment itself in a non detachable way but, then, it results in a difficult reading of the bar codes on the soft substrate, that is the textile of the garment.

Besides, it is rather easy to reproduce such tags since bar codes are visible by definition, which makes it possible to modify, in particular, the identification, the price and the mark.

Consequently, it has been suggested that such tags be made as magnetic strips arranged on a flexible substrate and then encoded using binary magnetic states.

OBJECTS AND SUMMARY OF THE INVENTION

The object of the present invention is to provide for a reading apparatus for a magnetic tag consisting of a coded magnetic strip arranged on a flexible substrate, for instance made of some textile.

The invention relates to a reading apparatus for a magnetic tag consisting of a magnetic strip, which is arranged on at least one face of a substrate and which is coded on a determined length according to a determined number of magnetic states, said reading apparatus comprising:

first means consisting of N elementary detectors arranged side by side for, simultaneously, detecting the N magnetic states coded on said magnetic strip and for generating N electrical signals indicative of said magnetic states, second electronic means for processing said electrical signals in order to determine the meaning of said magnetic states, and third means for displaying the meaning of said magnetic states, characterized in that the N elementary detectors form a detection unit and in that said detection unit is mounted on fourth means for moving it in such a direction that it can squeeze said magnetic strip on a plate integral with said box.

BRIEF DESCRIPTION OF THE DRAWINGS

Other features and advantages of the present invention will become more apparent from the following description of a particular embodiment, when taken in conjunction with the accompanying drawings, in which:

FIG. 2b is an isometric projection of a part of the reading unit shown in FIG. 2a;

Detailed Description

Figure 1:
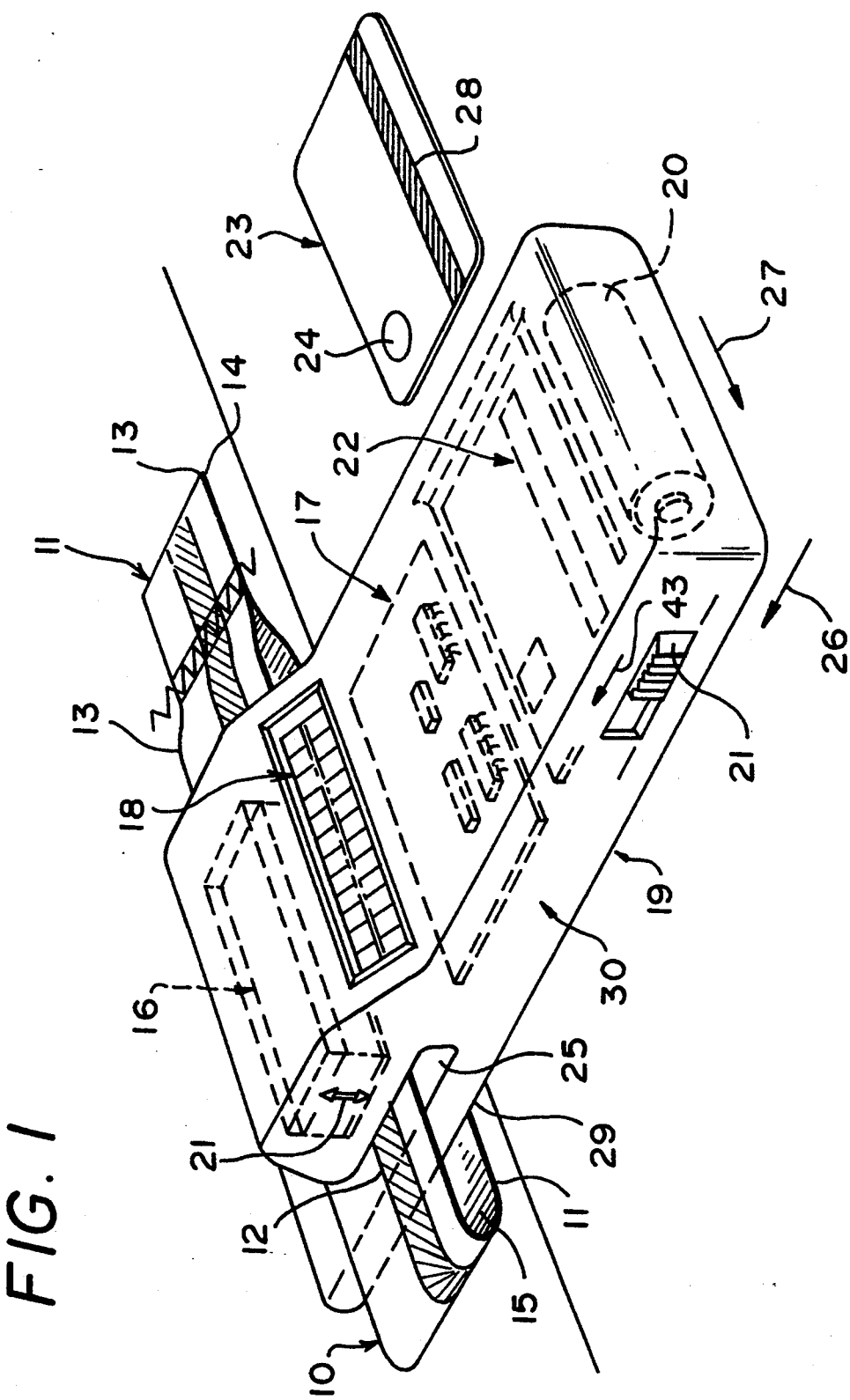
FIG. 1 shows, in an isometric projection, a reading apparatus for a magnetic tag on a flexible substrate according to the invention.

Identical parts are designated by the same reference numerals throughout the figures.

The invention will now be described as applied to the reading of a magnetic tag 10, consisting of a flexible substrate 11 on which a magnetic strip 12 is arranged. For instance, the flexible substrate is a small textile ribbon having a width equal to 20 millimeters on which a 6.25 millimeters wide magnetic strip has been deposited.

The magnetic strip 12 is encoded in such a manner that a number of data, in the form of magnetic states, are recorded lengthwise, such data including, for instance, the trade mark, the type of garment, its size and its colour.

The magnetic strip is sewn on the garment with both ends 13 and 14, which are fastened together so as to form a loop 15 having the magnetic strip 12 on its outer face.

The reading apparatus 30 according to the invention for such a magnetic tag 10 essentially comprises a detection unit (also called reading unit) 16, which detects the magnetic states of the strip and delivers electrical signals to an electronic processing circuit 17, which processes the electrical signals transmitted by the detection unit 16, and a display device 18 for the display, in plain language, of the data recorded in the form of magnetic states. These three basic elements 16, 17 and 18 are arranged on the same support in the form of a box 19, preferably capable of being easily taken and held by a human hand.

The box 19 is also used as a receptacle for a built-in electric power source, such as a battery 20. It also comprises at least one control switch 21 for supplying with electric power the three elements 16, 17, 18 as well as any additional element.

Among the additional elements which may complete the three basic elements 16, 17 and 18, there are a shifting device (not shown) for the detection unit 16 according to the directions shown by the two-headed arrow 9, and a reading device 22 for a card 23 having a magnetic strip 28 or, more preferably, an integrated circuit 24.

Thanks to its shifting device, the detection unit 16 cooperates with a plate 25 which extends from the box 19 under the unit 16 and beyond it. Such a plate 25 enables the reading apparatus 30 to be introduced into the loop 15 of the tag 10 (arrow 26), which is assumed to be fixed on the garment, and thus the magnetic strip 12 can be brought between the detection unit 16 and the plate 25. In this position, the user of the reading apparatus 30, by operating the control switch 21, causes the detection unit 16 to be drawn down against the magnetic strip 12 for the detection of the magnetic states.

In order that the locations of the magnetic states on the magnetic strip 12 may coincide with those of the detecting elements of the detection unit 16, the user of the reading apparatus 30 moves the later in the direction of arrow 27 so as to bring the edge 29 of plate 25 in the rounded portion of loop 15.

The detection unit 16 for the detection of the magnetic states of the magnetic strip 12 can be constructed in various ways and two of them will be described in conjunction with FIGS. 2 and 3. Whatever the mode of construction may be, that is the embodiments to be described or any other one, the detection unit shall comprise a plurality of detecting unit elements, placed side by side according to a spacing corresponding to that of the elementary magnetic states of the strip. The number of such unit elements shall be equal to that of the elementary magnetic states to be detected on the strip, for instance N=16.

Figure 2A:
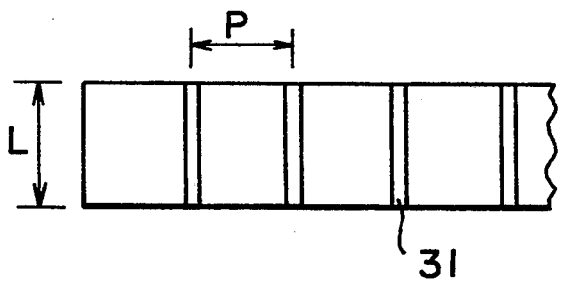
FIG. 2a is a front view of a part of a first example of embodiment of a reading unit for the reading apparatus according to the invention.
Figure 2B:
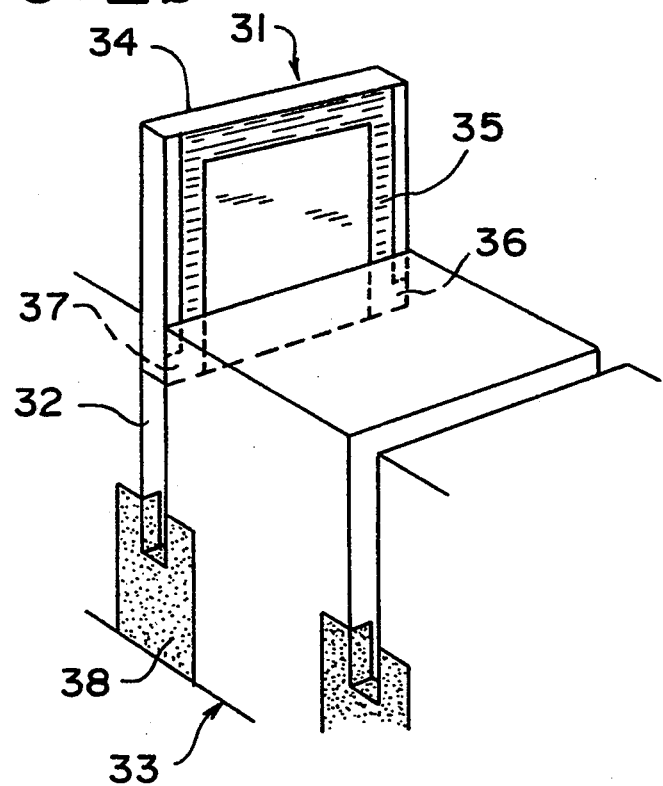

In FIGS. 2a and 2b, the detecting unit elements are magnetoresistors 31 which are fitted into notches 32 in a block 33 of a nonmagnetic material, such as a ceramic. Each magnetoresistor 31 is comprised of a leaf 34, or substrate, made of a nonmagnetic material, such as silicon, on which is arranged a magnetoresistive loop 35 whose ends 36 and 37 contact, at the bottom of the notch 32, metal layers 38 deposited on the side faces of block 33 and at the bottom of the notches.

As an example, such a block 33 has a width L of 3 millimeters and the spacing P of the magnetoresistors amounts to 3 millimeters as well, whereas each magnetoresistor has a thickness amounting to a few tenths of a millimeter.

Figure 3:
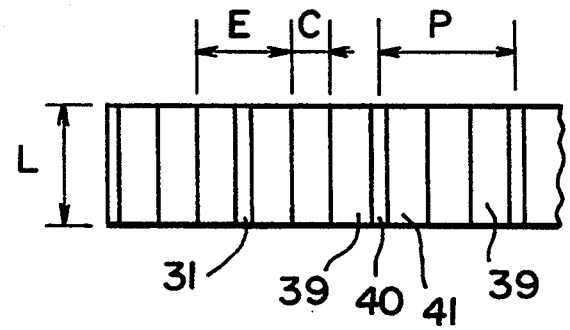
FIG. 3 is a front view of a part of a second example of embodiment of a reading unit for the reading apparatus according to the invention.

FIG. 3 is a front view of a detection unit, similar to that described in reference to FIG. 2, but yet comprising complementary intercalated elements inserted in between the magnetoresistive elements 31 for the purpose of improving the detection of the magnetic states of the strip. Such complementary intercalated elements consist of a pair of magnetic pole pieces 39 and 40 arranged on either side of each magnetoresistive element 31. Such pole pieces 39 and 40, which are close to each other between two magnetoresistive elements, are separated by a nonmagnetic material layer 41, for instance a ceramic, which constitutes the base or structural material forming the detection unit, just like the embodiment shown in FIG. 2.

As an example, the pole pieces 39 and 40, which lie on either side of the magnetoresistive element 31, have as a whole a thickness E of about two millimeters, whereas the nonmagnetic layer 41 has a thickness C of one millimeter, which gives a spacing P of about three millimeters between each magnetoresistive element, just like the embodiment shown in FIG. 2. The block width L amounts to three millimeters as well.

Figure 4:
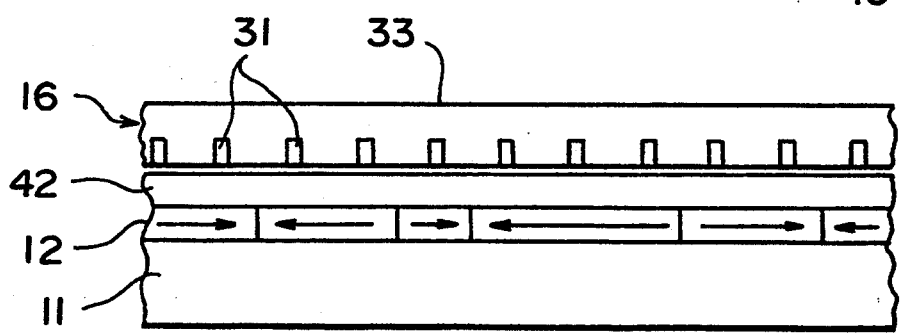
FIG. 4 is a theoretical drawing diagrammatically showing the locations of the magnetoresistive elements of the reading unit in relation to the magnetic states of the magnetic strip.

FIG. 4 shows in a longitudinal section, both theoretically and diagrammatically, the locations of the magnetoresistive elements 31 of the detection unit 16 with respect to the magnetic states of strip 12, indicated by arrows pointing to the right for the conventional designation of "ZERO" binary states, and to the left for the conventional designation of "ONE" binary states. With such a convention, the binary code recorded on the strip portion shown in FIG. 4 is 00110111001 for eleven magnetic states, which are placed side by side.

In FIG. 4, the magnetic strip 12 is coated by a layer 42 which is placed between the strip 12 and the detection unit 16. This layer is not necessary though preferred in order to achieve some special effects. For instance, it can provide a chemical and mechanical protection. It may have different colours, each colour referring to a particular feature of the labelled product. It may be made of a nonmagnetic or a magnetic material and, in the latter case, it forms together with the magnetic strip 12 a double-layered magnetic structure, in which each layer has a different coercive force 1 for the purpose of particular applications like those described in French patent application no. 92 03388 filed on Mar. 20, 1992 and entitled "Method for the recording and reading of a two-layer magnetic tape, and system of implementation".

As a general rule, the coercive field of the magnetic strip 12 must be quite high, in the order of 4,000 oersteds, whereas the magnetic tapes usually on the market have a coercive field of a few hundred oersteds, this in order to protect the recorded magnetic states against the effects of disturbing magnetic fields and fraudulent attempts.

The operation and the procedure of implementation of the reading apparatus according to the invention are described below, as regards the reading of a magnetic tag 10. The loop 15 of tag 10 is opened wide apart so as to allow space for the introduction (arrow 26) of plate 25, in such a way that the tag arrives under the detection unit 16, which is in the high position. Moreover, the reading apparatus is moved to the left (arrow 27) to enable the plate 25 to come into contact with the edge of the loop 15. In such a position, the user operates the control switch 21 in the direction of arrow 43, which results in supplying with electric power the various elements, such as the detection unit 16, the shifting device (not shown) of the latter, the electronic processing circuit 17 and the display device 18. The powering of the shifting device causes the downward motion of the detection unit 16, so that the magnetic strip 12 and its substrate 11 become caught between the plate 25 and the detection unit 16.

After a time delay in this position, an electrical signal generated by the electronic processing circuit 16 permits the detection of the magnetic states and the processing of the electrical signals corresponding to such states, so that the display device 18 may display their meaning.

Once the meaning is read, the user may release the control switch 21, which cuts off the supply, and terminates the tag reading operation.

According to the applications under consideration, the display device 18 indicates, for instance, the manufacturer's name and/or that of the seller, the type of garment, the identification number, the price, etc. . .

Such reading of the magnetic strip 12 may be combined, in the electronic processing circuit 17, with that of the data in the card 23, which is then inserted in the reading apparatus 22.

In a simple case, the electronic processing circuit 17 makes, in a comparator, a comparison between the names of the manufacturer and the seller read on the magnetic strips and those given by the card 23 and it gives the result of such comparison, that is the absence of frauds if the readings match and, if they don't, the presence of a fraud.

The comparison may also be drawn between the authorized latest selling dates depending on the collection involved, though such latest dates may be changed on the card 23 or by providing another card with other dates.

The invention has been described using a detection unit 16 of the magnetoresistor type but the invention can also be implemented using a detection unit of the HALL-effect type.

The present invention has been described as applied to the reading of a looped magnetic tag into which the device according to the invention is inserted. Yet the invention can also be implemented with a magnetic tag which would not be in the form of a loop and which would consist of a ribbon. In such a case, the relative positioning of the magnetic tag and of the detection unit can be effected in reference to the seam stitching the tag on to the garment, whether this tag is sewn by one end or by both ends.

In the above embodiment, the magnetic strip is arranged on the outer face of the loop 15 but it may be arranged on the inner face of this loop. In such an arrangement, the reading apparatus 30 must be held upside down in order to enable the read head 21 to contact the magnetic strip 12. Yet, such a turnover is not necessary if the textile ribbon is thin: it will merely result in a signal having a lower amplitude than in the case of the reading head directly contacting the magnetic strip.

The magnetic strip 12 is preferably encoded on a length at most equal to half the length of the loop and corresponding to the distance between the seam on ends 13 and 14 and the bend of the loop 15.

The magnetic strip 12 must be wide enough for an error-free simultaneous reading of all the magnetic states even if the reading head 16 is not in perfect register with the strip.

The invention has been described as applied to a magnetic strip substrate exhibiting an adequate flexibility for forming a loop. Yet, the invention can also be used when the magnetic strip 12 is arranged on a rigid substrate, such as the rigid cover of a book; the positioning of the read head relatively to the strip can, in this case, be based upon the edge(s) of the cover of the book.

What is claimed is:

1. A reading apparatus for a magnetic tag (10) having a magnetic strip (12), which is arranged on at least one face of a substrate (11) and which is coded on a determined length according to a determined number (N) of magnetic states, said reading apparatus comprising:
   first means (16) having N elementary detectors (31) arranged side by side for simultaneously detecting the N magnetic states coded on said magnetic strip (12) and for generating N electrical signals indicative of said magnetic states,
   second electronic means (17) for processing said electrical signals in order to determine the meaning of said magnetic states, and
   third means (18) for displaying the meaning of said magnetic states,
   characterized in that the N elementary detectors form a detection unit and in that said detection unit is mounted on fourth means for moving it in such a direction that it can squeeze said magnetic strip (12) on a plate (25) attached to a box (19); and characterized in that each elementary detector has a magnetoresistive loop (35); and characterized in that each magnetoresistive loop (31) is separated from the following one by a layer of a nonmagnetic material; and characterized in that said nonmagnetic material includes ceramic; and characterized in that it further includes:
   fifth means (22) for reading data recorded in a chip card (23);
   sixth means for comparing the data read from said chip card with those read from said magnetic strip (12) and for delivering information about the match condition or the unmatch condition, which is displayed by said third means (18); and characterized in that it further includes:
   seventh means (25) for positioning said first means (16) with respect to the locations of the magnetic states coded on said strip; and characterized in that said seventh means includes the combination of a magnetic tag (10) in the shape of a loop (15), and a finger or plate (25), one edge (29) of which comes into contact with a fold of the loop relatively to which the magnetic state locations are determined.

2. A reading apparatus according to claim 1, characterized in that the magnetic states are coded on the loop-shaped magnetic tag on a length of most equal to half that of the loop.

3. A reading apparatus according to claim 2, characterized in that said magnetic strip (12) is arranged on the outer face of the loop.

4. A reading apparatus according to claim 2, characterized in that said magnetic strip (12) is arranged on the inner face of the loop.

5. A reading apparatus for a magnetic tag having a magnetic strip, which is arranged on at least one face of a substrate and which is coded on a determined length, said reading apparatus comprising in a box:
   first simultaneous detection means of N magnetic states coded on said magnetic strip, generating N electrical signals indicative of said magnetic states,
   second electronic processing means of said electrical signals, determining the meaning of said magnetic states,
   third display means of the meaing of said magnetic states, wherein said magnetic strip is constituted by a flexible substrate of which both ends are fastened together so as to form a loop fixed on a product, and said box comprises further positioning means of said detection means with respect to the locations of the magnetic states coded on said strip, said positioning means including a plate which extends from said box under said detection means, one edge of said plate coming into contact with a fold of the loop relatively to which the magnetic state locations are determined.

6. A reading apparatus according to claim 5, wherein said positioning means include further moving means of said detection means in such a direction that they can squeeze said magnetic strip on said plate.

7. A reading apparatus according to claim 5, wherein the magnetic states are coded on the loop-shaped magnetic tag on a length of at most equal to half that of the loop.

8. A reading apparatus according to claim 7, wherein said magnetic strip is arranged on the outer face of the loop.

9. A reading apparatus according to claim 7, wherein said magnetic strip is arranged on the inner face of the loop.

10. A reading apparatus according to claim 5, wherein said detection means includes N elementary detectors arranged side by side, each one being constituted by a magnetoresistive loop separated from the following one by a layer of a nonmagnetic material.

11. A reading apparatus according to claim 10, wherein each magnetoresistive loop is flanked by two magnetic pole pieces which are adjacent to each other between two successive magnetoresistive loops being separated by a layer of a nonmagnetic material.

12. A reading apparatus according to claim 11, wherein said non-magnetic material includes ceramic.

13. A reading apparatus according to claim 12, wherein it further includes:
fifth means for reading data recorded in a chip card;
sixth means for comparing the data read from said chip card with those read from said magnetic strip and for delivering information about the match condition or the unmatch condition, which is displayed by said third means.

* * * * *